United States Patent [19]

Reckdahl

[11] 3,860,790

[45] Jan. 14, 1975

[54] DATA PROCESSING FORM

[75] Inventor: Segwald J. Reckdahl, Fridley, Minn.

[73] Assignee: Minnesota Mining and Manufacturing Company, St. Paul, Minn.

[22] Filed: Jan. 22, 1973

[21] Appl. No.: 325,592

[52] U.S. Cl. ..... 235/61.11 E, 35/48 A, 235/61.12 N

[51] Int. Cl. ......................... G06k 7/10, G06k 19/06

[58] Field of Search ............. 235/61.12 N, 61.11 E, 235/61.6 E; 35/48 R, 48 A, 48 B

[56] References Cited

UNITED STATES PATENTS

| | | | |
|---|---|---|---|
| 2,964,374 | 12/1960 | Miller | 35/48 B |
| 3,558,859 | 1/1971 | Dilsner et al. | 235/61.12 N |
| 3,576,430 | 4/1971 | Fickenscher et al. | 235/61.12 N |
| 3,628,031 | 12/1971 | Azure | 235/61.6 E |
| 3,676,646 | 7/1972 | Carlsen et al. | 235/61.12 N |

*Primary Examiner*—Daryl W. Cook
*Attorney, Agent, or Firm*—Alexander, Sell, Steldt & DeLaHunt

[57] ABSTRACT

A data processing form having a plurality of printed indication areas in which marks may be placed for subsequent sensing by an optical sensing apparatus. Each indication area contains a number of printed ring-shaped symbols which uniformly extend throughout the interior of the minimum dimensions of the indication area; the minimum dimensions being related to the size of the area which may be instantaneously sensed by the sensing apparatus. The optical density of the symbols is selected in relation to the sensitivity of the sensing apparatus such that the latter provides a signal indicative of a mark in the indication area when all of the symbols in the indication area are obliterated by the mark. Each indication area may further include printed bracket-shaped boundaries for defining the maximum dimensions of any mark which should be placed in an indication area so as to prevent the mark from being sensed as being present in more than one indication area.

9 Claims, 6 Drawing Figures

DATA PROCESSING FORM

BACKGROUND OF THE INVENTION

The present invention pertains to data processing forms of the type having a plurality of printed indication areas for use with an optical sensing apparatus which provides a signal in response to the sensing of a mark in an indication area. The present invention is particularly directed to improvements in such forms and in the use thereof whereby the reliability of a data processing system comprising a combination of such a data processing form and an optical sensing apparatus is enhanced.

Data processing forms of the type having a plurality of printed indication areas for receiving selectively placed marks have been known for many years. Examples of such forms and of optical sensing apparatus with which such forms may be used, appear in U.S. Pat. Nos. 3,518,440 to Hanson et al. and 3,601,906 to Roche.

To enhance the sensing of a mark by such sensing apparatus, the mark should be of minimum dimensions related to the size of an area which may be instantaneously sensed by the sensing apparatus. Accordingly indication areas are typically of at least such minimum dimensions, and the user is instructed to fill in the indication area completely when placing a mark therein.

Due to the idiosyncrasies of the multifarious users of such forms, pencil marks placed in the indication areas thereof vary significantly in quality (i.e. optical density and size) and thus create an incident unreliability in the data processing system comprising the combination of the data processing form and the optical sensing apparatus. Although the sensing apparatus is calibrated to sense marks of a given optical density, most such apparatus are nevertheless necessarily economically constructed to function within limited tolerances. As a result, when the users of the forms use pencils having different varieties of lead, when they vary the optical density of the mark from one indication area to another or even within a single indication area, or when they vary the size of the mark, such variations compounded by the apparatus tolerances introduce a significant unreliability into the data processing system. For example, a mark of insufficient optical density may not be sensed as a mark, and a mark which is too large may be sensed as being in both the intended indication area and an indication area adjacent thereto.

SUMMARY OF THE INVENTION

According to the present invention, reliability of such data processing systems is enhanced by providing the user of the data processing form with a gauge to assure him that a mark which he places in an indication area is of such quality that it will be sensed as a mark by the sensing means. The gauge is a plurality of printed symbols uniformly extending throughout the interior of the minimum dimensions of each answer indication area. The symbols have a printed area of an optical density selected in relation to the sensitivity of the sensing means such that the sensing means provide a signal indicative of a mark in an answer indication area when all of the symbols in the area are obliterated by a mark.

As a gauge to the user to prevent him from making his mark too large in size, especially after his having obliterated the symbols defining the minimum dimensions, each indication area may further comprise printed boundaries for defining maximum dimensions of any mark which should be placed in the indication area.

As a further gauge to the user when erasing a mark so as to assure that his erasure is sufficiently complete that the sensing apparatus will not provide a signal indicative of a mark, the optical density of the printed area of the symbols may further be selected in relation to the sensitivity of the sensing means such that the sensing means will not provide a signal indicative of a mark when all of the symbols in the indication area are fully visible.

The cumulative printed area of selected optical density within each indication area should be only a small portion of the total area defined by the minimum dimensions such that a signal indicative of a mark will not be provided when the sensing apparatus senses an unmarked indication area.

A preferred symbol is that of a ring. Rings may conveniently extend throughout the interior of the minimum dimensions of the indication area, and yet the cumulative printed area of selected optical density which defines the rings occupies only a small portion of the total area defined by the minimum dimensions. Also, rings are easily distinguished and not easily camouflaged by a user while making a mark with a typical back and forth motion.

The method of using the data processing form according to the present invention essentially includes the step of obliterating all of the symbols in an indication area when placing a mark therein; and may further include such steps as confining the mark to be within the broundaries defining the maximum dimensions; uncovering all of the symbols in an indication area, when erasing a mark therefrom, so that they are fully visble; instructing the user to obliterate all symbols in an indication area when placing a mark therein; instructing the user to confine a mark to be within the boundaries defining the maximum dimensions; and instructing the user to uncover all of the symbols in an indication area, when erasing a mark therefrom, so that they are fully visible. Such instructions may be given orally or in writing, such as by an instruction printed upon the data processing form.

DESCRIPTION OF THE PREFERRED EBODIMENTS

Figure 1:
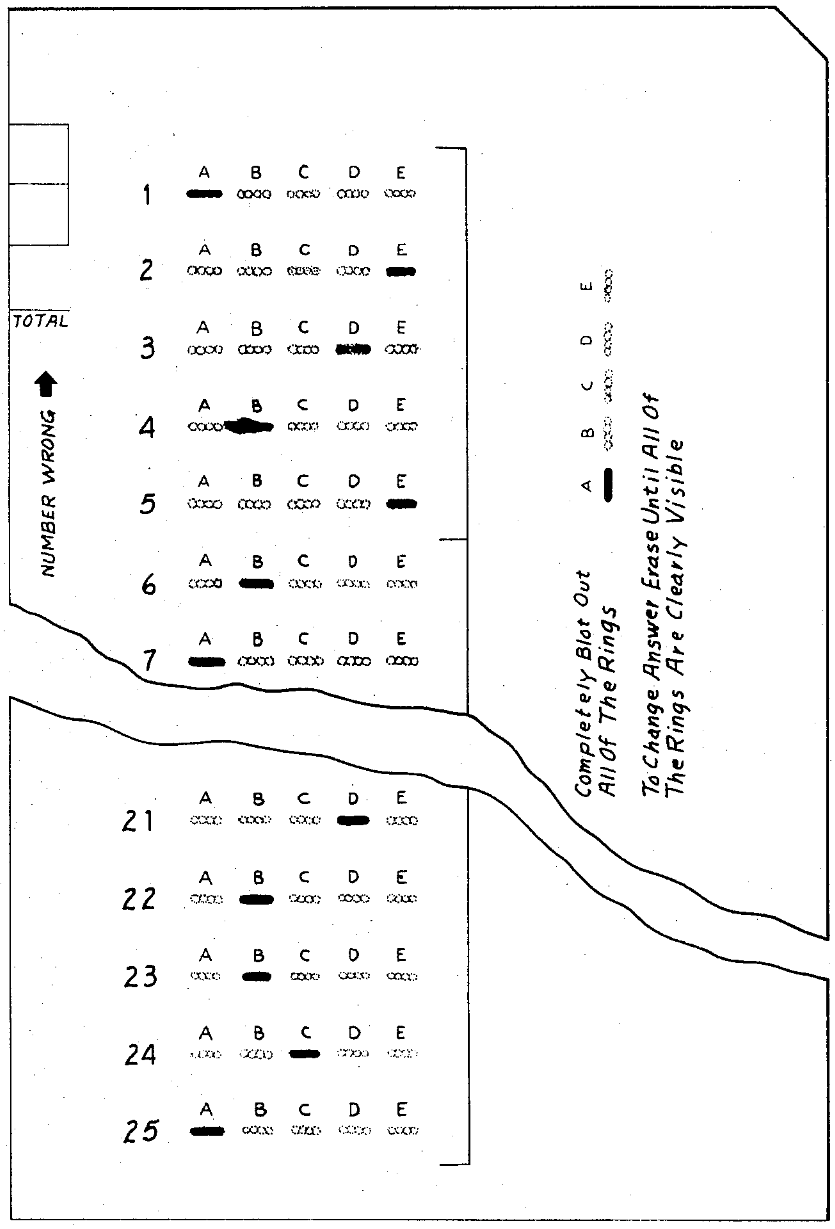
FIG. 1 is a view of a data processing form according to the present invention, with a portion thereof cut away.
Figure 2:
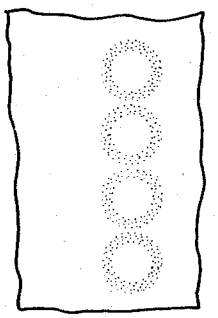
FIG. 2 is a view of one embodiment of an indication area which may be printed on the form shown in FIG. 1.

Referring to FIG. 1, wherein the data processing form is an answer sheet for use with a test grading device such as is described in the above referenced U.S. Pat. No. 3,601,906, each indication area includes four printed rings which extend throughout the interior of the minimum dimensions of the indication area. An enlarged view of a single indication area is provided in FIG. 2, wherein it is more readily apparent that each ring is made up of a pattern of printed dots. The size and the density of the dots determine the optical density of the printed area defined by the rings; which optical density is selected in relation to the sensitivity of the sensing device.

Again referring to FIG. 1, the data processing form includes instructions to the user. The first instrution reads: "Completely Blot Out All Of The Rings," and also illustrates an indication area wherein such has been done. The second instruction reads: "To Change Answer, Erase Until All Of Rings Are Clearly Visible." In indication area 1A all of the rings are obliterated in accordance with the first instruction. In indication area 2C, an erasure has been made in accordance with the second instruction until all of the rings are clearly visible. In indication area 3D the mark obscures the rings so that they are not clearly visible but it does not obliterate them. This is an improper mark in that it is not in accordance with the first instruction. That is not to say that the mark in indication area 3D would not be sensed as a mark by an optical sensing apparatus having a sensitivity in relation to which the optical density of the rings has been selected. However, it is uncertain how the mark in indication area 3D would be sensed.

Figure 3:
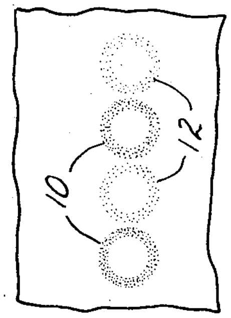
FIG. 3 is a view of another embodiment of an indication area which may be printed on the form shown in FIG. 1.

In one embodiment, as is illustrated in the enlarged view of the indication area shown in FIG. 3, each of the indication areas contains rings 10, 12 having different optical densities. The rings 10 have a greater optical density than do the rings 12. Yet the cumulative optical density of all the rings 10 and 12 is such that when all of the rings 10 and 12 are obliterated, the sensing apparatus will provide a signal indicative of a mark. Also the optical density of the lighter rings 12 is such that when all of the rings 10 and 12 are clearly visible, the sensing apparatus will not provide a signal indicative of a mark.

Referring to FIG. 1 again, the mark in indication area 4B is so large in size that there is a possibility that it may be sensed by the sensing apparatus as separate marks in both indication areas 4B and 4A.

Figure 5:
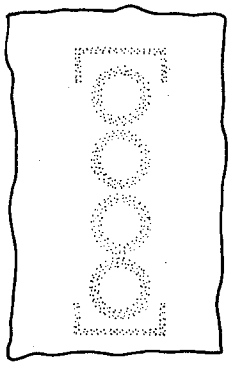
FIG. 5 is a view of an embodiment of an indication area which may be printed on the form shown in FIG. 4.
Figures 4, 6:
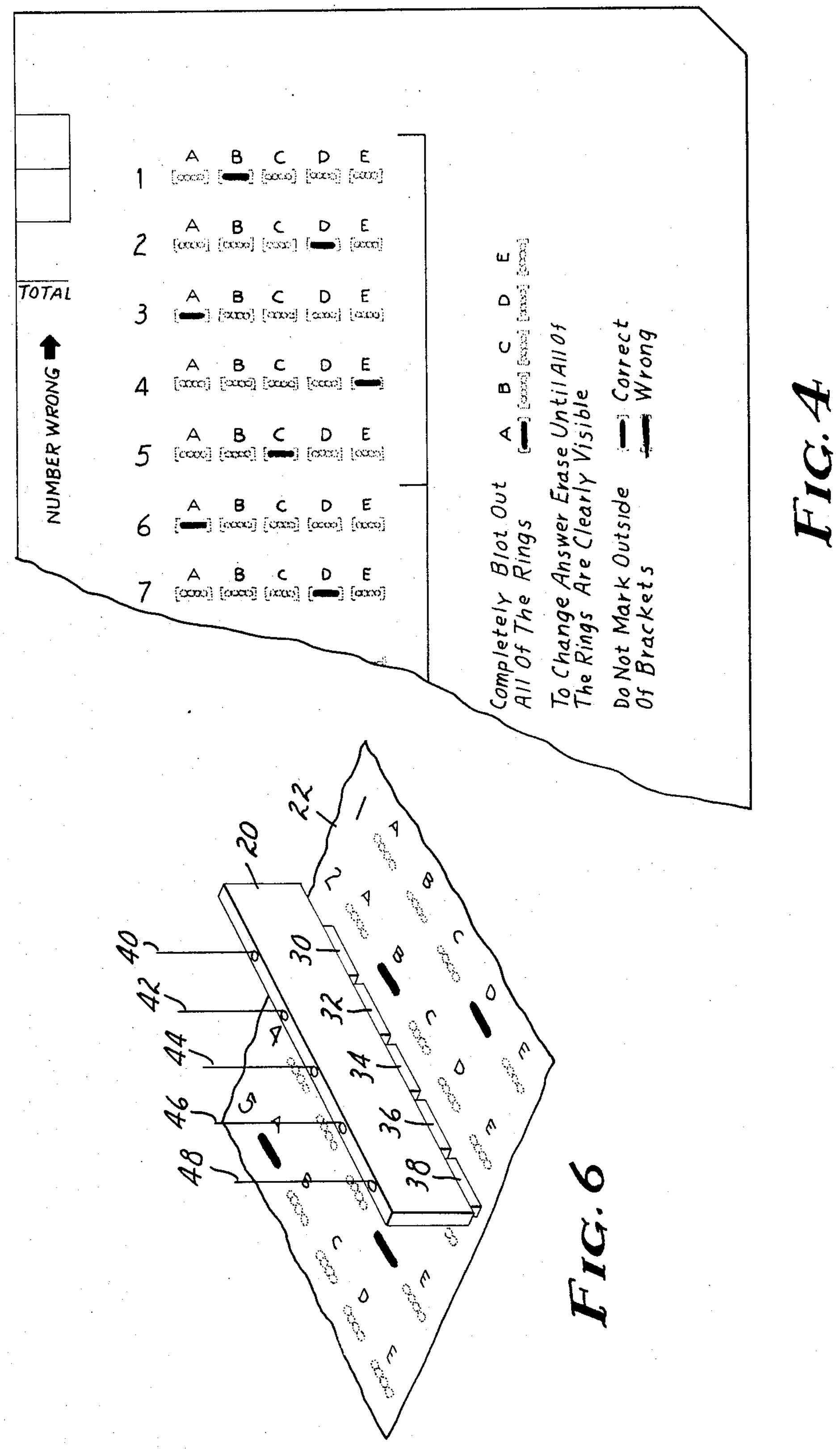
FIG. 4 is a view of another data processing form according to the present invention, with a portion thereof cut away.
FIG. 6 is a schematic illustration of that portion of a data processing system comprising a combination of an optical sensing apparatus and a data processing form according to the present invention.

To help prevent the likelihood of the marks being made too large in size, the embodiment of data processing form shown in FIG. 4 is also provided. In addition to containing rings as discussed with reference to FIGS. 1, 2 and 3, each indication area further contains printed brackets for defining maximum dimensions to help assure that a mark is sensed as such in only the intended indication area. An enlarged view of an indication area containing brackets is shown in FIG. 5. The optical density of the brackets should be light since the printed area thereof must be considered with that of the rings for purposes of sensitivity calibration. Referring again to FIG. 4, the form further includes a printed instruction reading: "Do Not Mark Outside Of Brackets" and illustrations showing both "correct" and "wrong" ways to make marks in regard to the brackets. The marks placed in various ones of the indication areas of the form of FIG. 4 have been correctly placed.

It is preferred that the indication areas be printed in black since marks are usually made with a black lead pencil; whereby it is believed that obliteration or sufficient erasure may be readily ascertained when the mark and symbol colors are the same. However, the symbols may also be printed in color even though a black lead pencil is to be used. Blue is an acceptable color when using a black lead pencil in that to the user, blue appears similar to black in ascertaining obliteration or sufficiency of erasure.

FIG. 6 schematically illustrates that portion of a data processing system comprising a combination of an optical sensing apparatus 20 and a data processing form 22 according to the present invention. The sensing apparatus 20 contains sensors 30, 32, 34, 36 and 38 for sensing the presence of marks in each of the rows A, B, C, D, and E of the form 22. When all of the symbols in an indication area are obliterated and that indication area is sensed, a signal is provided on one of the lines 40, 42, 44, 46, 48 corresponding to the respective sensor 30, 32, 34, 36, 38 sensing the mark. For example, when the mark in the indication area 2B is sensed, a signal is provided on the line 42.

Although within the system shown in FIG. 6, the mark is sensed by sensing reflected light, a system wherein transmitted light is sensed also is within the scope of the present invention.

What is claimed is:

1. A data processing form having the plurality of printed indication areas of minimum dimensions for use with an optical sensing apparatus which provides a signal in response to the sensing of a mark of said minimum dimensions in a said indication areas, wherein the improvement comprises each of the indication areas of the form including a gauge comprising a plurality of printed symbols uniformly extending throughout the interior of the minimum dimensions of the indication area, the symbols having a printed area of an optical density selected in relation to the sensitivity of the sensing apparatus such that the sensing apparatus provides a signal indicative of a mark in said indication area when all of the symbols in said indication area are obliterated by the mark.

2. A data processing form according to claim 1, wherein the gauge for each indication area further comprises printed boundaries for defining maximum dimensions of any mark which may be placed in a said indication area.

3. A data processing form according to claim 1, wherein the symbols comprise rings.

4. A data processing form according to claim 1, wherein the plurality of symbols in each answer indication area includes first and second symbols having respectively darker and lighter optical densities wherein the cumulative optical density of all the symbols is selected in relation to the sensitivity of the sensing apparatus such that the sensing apparatus provides a signal indicative of a mark in a said indication area when all of the symbols in said indication area are obliterated by the mark; and wherein the optical density of the second lighter symbols is selected in relation to the sensitivity of the sensing apparatus such that the sensing apparatus will not provide a signal indicative of a mark in a said indication area when all of the symbols in said indication area are fully visible.

5. A data processing system comprising the combination of a data processing form having a plurality of printed indication areas of minimum dimensions and an optical sensing apparatus which provides a signal in response to the sensing of a mark of said minimum dimensions in a said indication area, wherein the improvement comprises of the indication areas of the form including a gauge comprising a plurality of printed symbols uniformly extending throughout the interior of the minimum dimensions of the indication area, the symbols having a printed area of an optical density selected in relation to the sensitivity of the sensing apparatus such that the sensing apparatus provides a signal indicative of a mark in a said indication area when all of the symbols in said indication area are obliterated by the mark.

6. A data processing system according to claim 5, wherein the gauge for each indication area further comprises printed boundaries for defining maximum dimensions of any mark which may be placed in a said indication area.

7. A data processing system according to claim 5, wherein the symbols have a printed area of an optical density selected in relation to the sensitivity of the sensing apparatus such that the sensing apparatus will not provide a signal indicative of a mark in said indication area when all of the symbols in said indication area are fully visible.

8. A data processing system according to claim 5, wherein the symbols comprise rings.

9. A data processing system according to claim 5, wherein the plurality of symbols in each answer indication area includes first and second symbols having respectively darker and lighter optical densities wherein the cumulative optical density of all the symbols is selected in relation to the sensitivity of the sensing apparatus such that the sensing apparatus provides a signal indicative of a mark in a said indication area when all of the symbols in said indication area are obliterated by the mark; and wherein the optical density of the second lighter symbols is selected in relation to the sensitivity of the sensing apparatus such that the sensing apparatus will not provide a signal indicative of a mark in a said indication area when all of the symbols in said indication area are fully visible.

* * * * *

UNITED STATES PATENT OFFICE
CERTIFICATE OF CORRECTION

PATENT NO. : 3,860,790

DATED : January 14, 1975

INVENTOR(S) : Segwald J. Reckdahl

It is certified that error appears in the above-identified patent and that said Letters Patent are hereby corrected as shown below:

Column 3, line 18, change "instrution" to -- instruction --.

Column 5, line 10, before "of" (first occurrence) insert -- each --.

Signed and Sealed this

*twenty-second* Day of *July 1975*

[SEAL]

*Attest:*

RUTH C. MASON
*Attesting Officer*

C. MARSHALL DANN
*Commissioner of Patents and Trademarks*